(12) United States Patent
Hoβbach et al.

(10) Patent No.: US 8,684,598 B2
(45) Date of Patent: Apr. 1, 2014

(54) THERMOELEMENT

(75) Inventors: Christian Hoβbach, Laubach-Lauter (DE); Peter Krieg, Weimar (DE); Detlef Maiwald, Moers (DE); Hans-Peter Mnikoleiski, Duisburg (DE); Wolfgang Uhrig, Laubach-Gonterskirchen (DE)

(73) Assignee: innovatherm Prof. Dr. Leisenberg GmbH & Co. KG, Butzbach (DE)

( * ) Notice: Subject to any disclaimer, the term of this patent is extended or adjusted under 35 U.S.C. 154(b) by 214 days.

(21) Appl. No.: 13/068,426

(22) Filed: May 11, 2011

(65) Prior Publication Data
US 2011/0292968 A1 Dec. 1, 2011

(30) Foreign Application Priority Data
May 11, 2010 (EP) .................................. 10162481

(51) Int. Cl.
*G01K 7/02* (2006.01)
*G01K 1/08* (2006.01)

(52) U.S. Cl.
USPC ........... 374/179; 374/141; 374/163; 374/208; 136/200

(58) Field of Classification Search
USPC ......... 374/163, 183, 185, 208, 179, 100, 141; 136/200; 73/866.5
See application file for complete search history.

(56) References Cited

U.S. PATENT DOCUMENTS

| | | | | |
|---|---|---|---|---|
| 2,888,508 A * | 5/1959 | Rademacher | ................. | 136/231 |
| 4,428,686 A | 1/1984 | Brax | | |
| 4,553,432 A * | 11/1985 | Barlian et al. | ................. | 374/142 |
| 4,904,091 A * | 2/1990 | Ward | ........................... | 374/179 |
| 4,984,904 A * | 1/1991 | Nakano et al. | ................. | 374/139 |
| 5,181,779 A * | 1/1993 | Shia et al. | ..................... | 374/139 |
| 5,242,226 A * | 9/1993 | Ross et al. | ..................... | 374/208 |
| 5,360,269 A * | 11/1994 | Ogawa et al. | .................. | 374/140 |
| 5,678,926 A | 10/1997 | Stansfeld et al. | | |
| RE36,285 E * | 8/1999 | Stansfeld et al. | .............. | 374/208 |
| 5,978,756 A * | 11/1999 | Walker et al. | .................. | 704/210 |
| 6,059,453 A * | 5/2000 | Kempf et al. | ................... | 374/179 |
| 6,536,950 B1 * | 3/2003 | Green et al. | ................... | 374/179 |
| 6,568,849 B1 * | 5/2003 | Chen et al. | ..................... | 374/185 |
| 7,004,626 B1 * | 2/2006 | Giberson et al. | .............. | 374/179 |
| 7,997,795 B2 * | 8/2011 | Schwagerman et al. | ...... | 374/179 |
| 8,182,146 B2 * | 5/2012 | Brun et al. | ..................... | 374/208 |
| 8,197,134 B2 * | 6/2012 | Robinson | ....................... | 374/179 |
| 2002/0021743 A1 * | 2/2002 | Ruppert et al. | ............... | 374/179 |
| 2009/0141772 A1 * | 6/2009 | Robinson | ....................... | 374/179 |
| 2010/0322286 A1 * | 12/2010 | Toyama et al. | ................ | 374/179 |
| 2011/0051777 A1 * | 3/2011 | Schlipf | .......................... | 374/179 |

FOREIGN PATENT DOCUMENTS

GB 880 605 A 10/1961

* cited by examiner

*Primary Examiner* — Gail Verbitsky
(74) *Attorney, Agent, or Firm* — Pandiscio & Pandiscio

(57) ABSTRACT

A thermoelement for measuring the temperature in gaseous or fluid media by means of one or more thermocouples comprising wires of different metals welded together which give off a resulting electrical voltage when heated and are configured as a measuring insert arranged in an insulating rod disposed in a heat-resistant protective tube that can be connected to a connection head, the protective tube being wholly or partially surrounded by a holding tube. To prevent a high input of heat which has an unfavourable effect on temperature measurement, the holding tube is supported against the protective tube at a radial distance from the protective tube, and a heat-resistant trace and optionally an insulating material are inserted between the protective tube and the holding tube, and the holding tube is attached to the connection head and/or the protective tube in one or both end areas and is provided with thermal insulation.

12 Claims, 3 Drawing Sheets

THERMOELEMENT

BACKGROUND OF THE INVENTION

1. Field of the Invention

The present invention relates to a thermoelement for measuring the temperature in gaseous or fluid media by means of one or more thermocouples, each comprising wires of different metals welded together, which give off a resulting electrical voltage when heated, and are configured as a measuring insert arranged in an insulating rod inserted in a heat-resistant protective tube that can be connected to a connection head, in which case the protective tube is wholly or partially surrounded by a holding tube.

2. Description of the Prior Art

Thermoelements of this kind are familiar in numerous different embodiments and have proven effective in practice for measuring the temperature in thermal process systems. Although the protective tube and/or also the holding tube are manufactured from more or less heat-resistant materials, according to the particular application, the heat input into the contact surfaces of the protective tube and/or the holding tube is considerable, especially at the connection head. This results in impairments and therefore inaccuracies in measuring results, with the effect that incorrect temperature data must be accepted.

SUMMARY OF THE INVENTION

It is therefore an object of the present invention to provide a thermocouple of the aforementioned type in which a high input of heat, which has an unfavourable effect on the temperature measurement, is avoided. Instead, it is adapted to ensure that the connection head is insulated against heat to a large extent, so that incorrect temperature measurements are practically excluded and the thermoelement is not sensitive to thermal shocks. The construction complexity in order to achieve this should be kept low, whilst nevertheless providing high measuring accuracy with a simple design.

In accordance with the present invention, this is achieved in a thermoelement of the aforementioned kind wherein the holding tube is supported against the protective tube at a radial distance from the protective tube, a heat-resistant trace and, preferably, an insulating material are disposed between the protective tube and the holding tube, and the holding tube is attached to a connection head, and/or the protective tube, in one, or both, end areas with thermal insulation.

The trace preferably is made from a heat-resistant or ceramic material and arranged in a helical profile between the protective tube and the holding tube. In addition, the trace is attached to the outer jacket surface of the protective tube and/or the holding tube, and preferably glued onto it/them, in order to prevent the trace from shifting its position during operation.

Moreover, it is appropriate for an air gap between the protective tube and the holding tube, which also functions as a thermal insulator, to be closed at both ends in order to hold the trace or, alternatively, for it to be constricted to result in a clearance that is smaller than the diameter of the trace.

To avoid damage during installation of the thermoelement due to excessively hard contact between a support leg and the corresponding component of the thermal process system and, in accordance with an alternative embodiment, there is provision for the holding tube arranged between the connection head and the support leg to be divided into two sections, and for a coil compression spring disposed between the two sections, such that the coil compression spring is supported against the sections, in which case the end areas of the coil compression spring are firmly connected to the two sections, preferably by means of crimping.

The trace in this embodiment is only to be provided in the section of the holding tube attached to the connection head and, in the end areas, to be firmly connected to the connection head and the corresponding section, e.g. by means of crimping, or glued onto the section or the protective tube.

According to a further embodiment, there is provision for the holding tube to be provided on the side facing the measuring insert with a radially projecting support leg configured as a flange and to attach it to this in a thermally insulating manner by means of one or more insulating or sealing discs inserted between the support leg and the measuring insert. Also, the holding tube should be connected to the connection head on the side facing the latter by means of one or more insulating or sealing discs located between the connection head and the holding tube with thermal insulating properties.

Furthermore, it is advantageous for the holding tube to be supported against the protective tube on the end facing the connection head in a torsionally rigid arrangement. The holding tube is therefore provided with a partially open flange with one or more grooves into which the protective tube engages with an axially projecting shoulder for each groove located in the outer edge area.

Due to this embodiment, the protective tube and/or the holding tube can be made from a gas-tight, heat resistant material, preferably, of silicon carbide, with the effect that it is insensitive to thermal shock.

If a thermoelement is configured in accordance with the present invention, the heat input into the connection head via the holding tube is practically excluded although the holding tube can be manufactured from silicon carbide and, as a result, falsifications of the measuring results are to all intents and purposes ruled out. The thermally insulating arrangement of the protective tube in relation to the holding tube, as well as the thermally insulating attachment of the holding tube on the connection head, ensures that the connection head is not influenced by conducted heat. Also, because the holding tube is supported on the protecting tube in a torsionally rigid arrangement and because it can be configured in sections, this provides for an operationally reliable construction, as well as installation of the thermoelement, without damage. Accordingly, with little complexity, a thermoelement is provided which permits accurate measurements of temperature to be taken over long periods, in excess of 1200° C., without susceptibility to thermal shocks, for example in mobile measuring positions.

BRIEF DESCRIPTION OF THE DRAWINGS

The drawings show a sample embodiment of a thermoelement configured in accordance with the present invention, the details of which are explained below. In the drawings.

DESCRIPTION OF THE PREFERRED EMBODIMENTS

Figure 1:
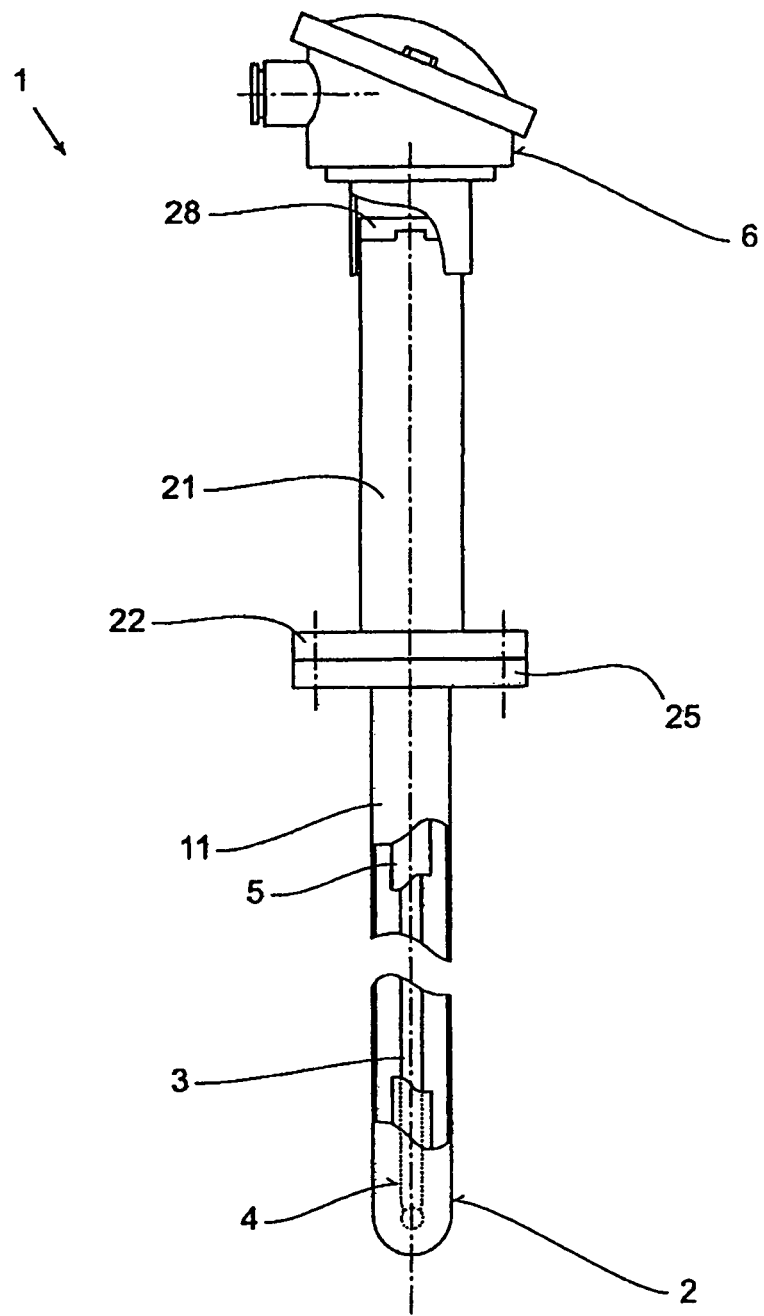
FIG. 1 shows the thermoelement in partial section.

The thermoelement 1 shown in FIG. 1 is used for measuring temperatures in gaseous or fluid media in thermal process systems and is provided with a measuring insert 2 attached to a connection head 6 and is surrounded by a protective tube 11 and a holding tube 21. The measuring insert 2 comprises an insulating rod 3, and an inner tube 5, and thermocouples 4 comprising wires of different kinds of metals welded together.

In order to avoid a high level of heat input into the connection head 6, the holding tube 21 is disposed at a radial distance from the protective tube 11, with an air gap 30 (FIG. 2) is formed between them. A trace 31 of a heat-resistant or ceramic material is arranged in a helical profile in the air gap 30 and is wrapped around the protective tube 11, and is glued onto it, and/or the holding tube 21, and the trace 31 supports the holding tube 21 on the protective tube 11. The air gap 30 acts as a thermal insulator. If necessary, insulating material 33 can be filled in the air gap 30 as well, as is shown in FIG. 2.

Figure 2:
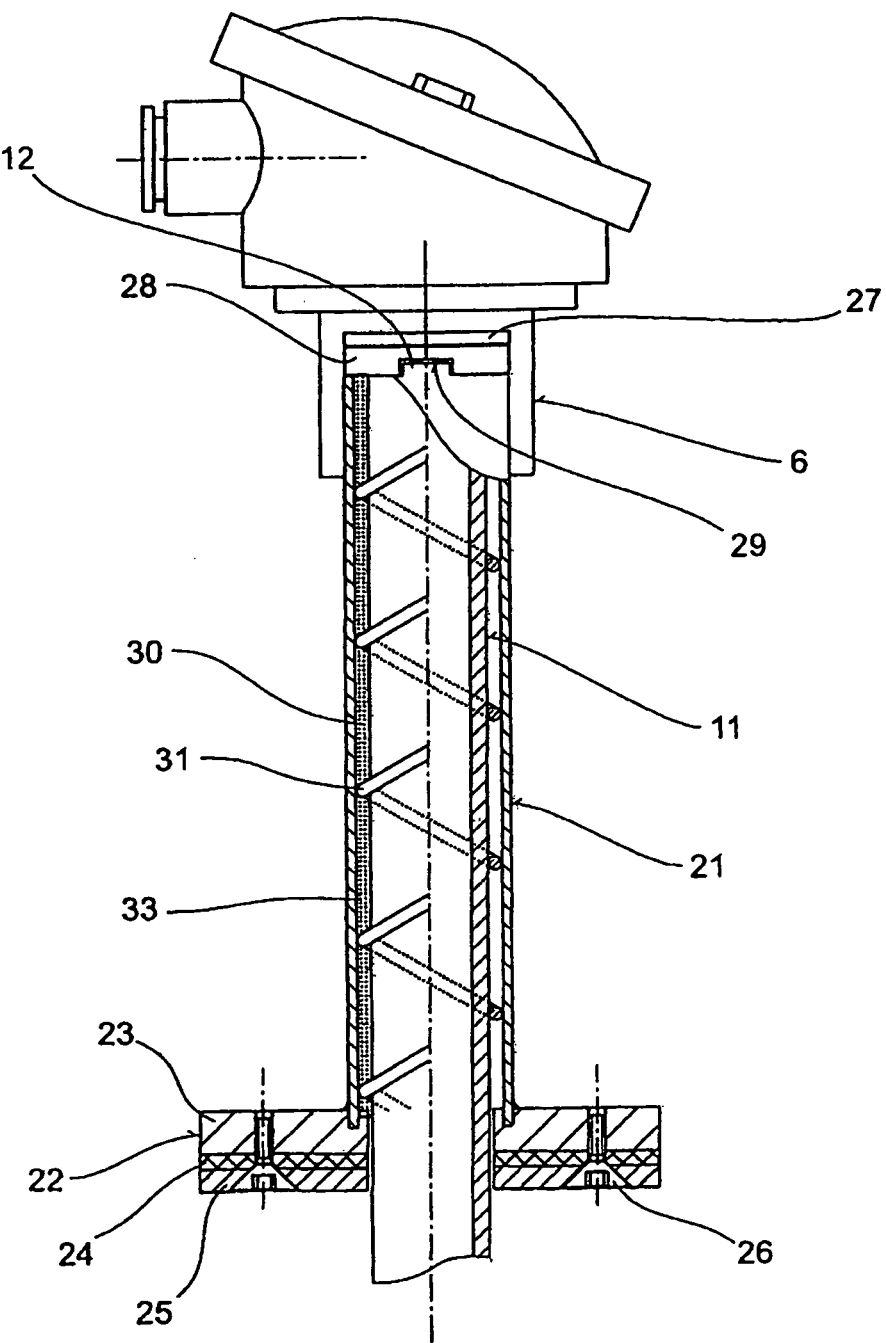
FIG. 2 shows the protective tube engaging in the holding tube in the thermoelement in accordance with FIG. 1, in an enlarged view and in an axial section.

The holding tube 21, which like the protective tube 11, can be of silicon carbide, is configured in one piece in the embodiment shown in FIG. 2 and is provided with a flange 28 at the end facing the connection head 6, with radial grooves 29 disposed in an outer edge area of the flange 28. The protective tube 11, on the other hand, is provided with shoulders 12 corresponding to, and engaging in, the grooves 29, with the effect that the protective tube 11 is connected to the holding tube 21 in a torsionally rigid arrangement and is thereby secured. The thermal cables 4 can be inserted into the connection head 6 through the flange 28.

On a side facing the measuring insert 2, the protective tube 11 furthermore is provided with a radially projecting flange 23 configured as a support leg 22, with a sealing and insulating disc 24 attached to the flange 23 by means of a flange plate 25 and screws 26. Also, a sealing and insulating disc 27 is provided between the flange 28 and the connection head 6, with the effect that the holding tube 21 is connected to the support leg 22 in both end areas in a thermally insulated manner, firstly on the connection head 6, and secondly on the flange plate 25 to which the support leg 22 is connected.

The heat input into the connection head 6 via the holding tube 21 and the protective tube 11 is therefore slight, and as a result the temperature values measured by the measuring insert 2 are not unfavourably impaired, with the effect that incorrect temperature measurements are avoided.

Figure 3:
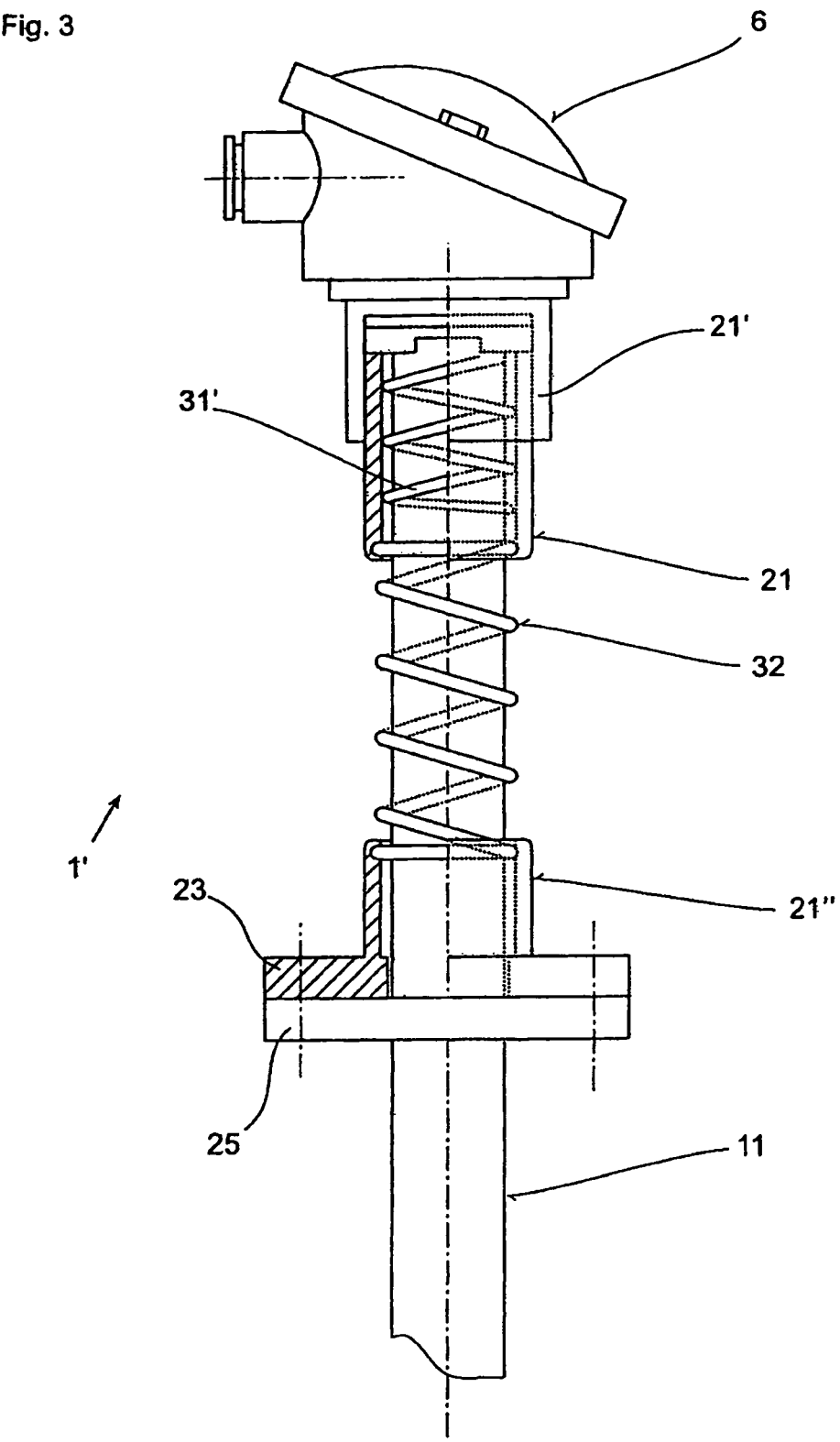
FIG. 3 shows an embodiment with a split holding tube.

In the embodiment of the thermoelement 1' shown in FIG. 3, the holding tube 21 is configured divided into two sections 21' and 21", and a coil compression spring 32 is disposed between the two sections 21' and 21", with the coil compression spring 32 supported against the sections 21' and 21". The coil compression spring 32 is firmly connected to the sections 21' and 21" by crimping the mutually opposite ends of the sections 21' and 21". In addition, in order to prevent heat input into the connection head 6 to a large extent, a heat-resistant trace 31' is arranged in a fixed position only between the protective tube 11 and the section 21'.

The support leg 22 is therefore placed on the protective tube 11 in a manner which permits restricted movement, with the effect that damage to the thermoelement 1, and, in particular, to the brittle protective tube 11, e.g. by hard contact between the support leg 22 and the corresponding component of a thermal process system, is largely avoided.

What is claimed is:

1. A thermoelement for measuring the temperature of gaseous or fluid media by means of at least one or more thermocouples comprising wires of different metals welded together to provide a resulting electrical voltage when heated, and comprising a measuring insert wherein there is disposed an insulating rod within a heat-resistant protective tube connected to a connection head, the protective tube being at least in part surrounded by a holding tube,
   wherein the holding tube is supported around the protective tube, radially of the protective tube, and around a heat-resistant trace disposed within the holding tube, and an insulating material disposed between the protective tube and the holding tube, the holding tube is being attached to at least one of the connection head and the protective tube in at least one end area thereof;
   wherein the trace is of a selected one of a heat-resistant and ceramic material; and is arranged in a helical manner between the protective tube and the holding tube.

2. The thermoelement in accordance with claim 1, wherein the trace is attached to a selected one of an outer surface of the protective tube and an inner surface of the holding tube.

3. The thermoelement in accordance with claim 1, wherein an air gap between the protective tube and the holding tube is closed at ends thereof to hold the trace or is constricted to provide a clearance smaller than the diameter of the trace.

4. The thermoelement in accordance with claim 1, wherein the holding tube is disposed between the connection head and a support leg is divided into comprising two sections, and a coil compression spring is disposed between the two sections of the holding tube such that the coil compression spring is supported against the two sections of the holding tube.

5. The thermoelement in accordance with claim 4, wherein end areas of the coil compression spring are connected to the two sections of the holding tube by crimping.

6. The thermoelement in accordance with claim 4, wherein the trace is disposed in the section of the holding tube attached to the connection head, and in end areas thereof, is connected to the connection head and a corresponding section of the holding tube, by a selected one of crimping and glueing onto a selected one of the section and the protective tube.

7. The thermoelement in accordance with claim 1, wherein the protective tube is provided on a side facing the measuring insert with a radially projecting support leg comprising a flange and is attached thereto in a thermally insulated manner by means of at least one insulating or sealing discs disposed between the support leg and the measuring insert.

8. The thermoelement in accordance with claim 1, wherein the holding tube is connected to the connection head and facing the connection head-by means of at least one insulating or sealing disc disposed between the connection head and the holding tube.

9. The thermoelement in accordance with claim 1, wherein the holding tube is supported against the protective tube on a side facing the connection head in a rigid arrangement.

10. The thermoelement in accordance with claim 9, wherein the holding tube is provided with a partially open flange with at least one groove into which the protective tube engages with an axially projecting shoulder for each groove, located in an outer edge area.

11. The thermoelement in accordance with claim 1, wherein the protective tube is of a heat resistant material.

12. The thermoelement in accordance with claim 11, wherein the heat resistant material comprises silicon carbide.

* * * * *